March 22, 1966  G. B. PUMPHREY  3,241,865
SAFETY MEANS FOR GLAD HAND COUPLINGS
Filed Aug. 7, 1963  2 Sheets-Sheet 1
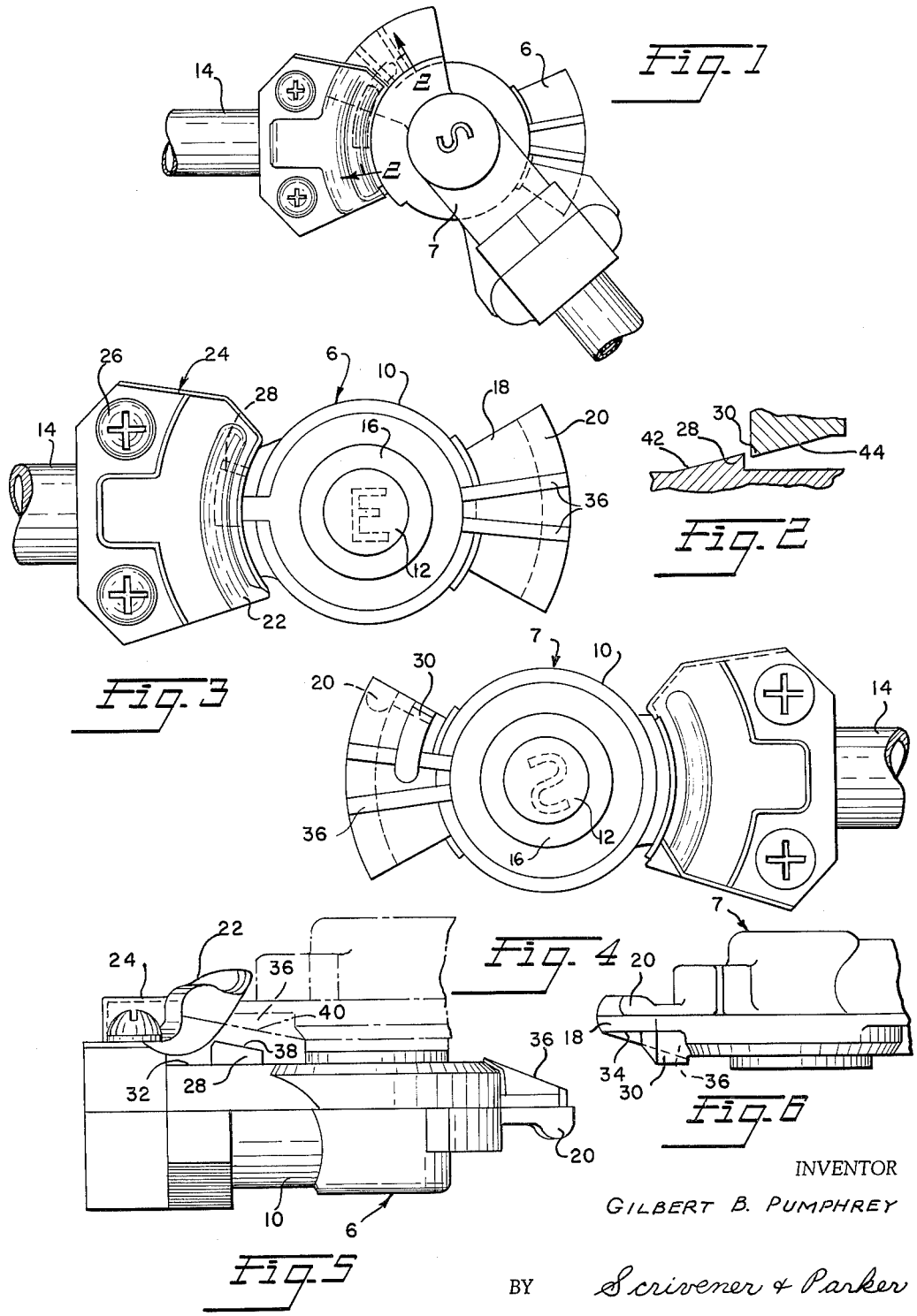
INVENTOR
GILBERT B. PUMPHREY
BY Scrivener & Parker
ATTORNEYS

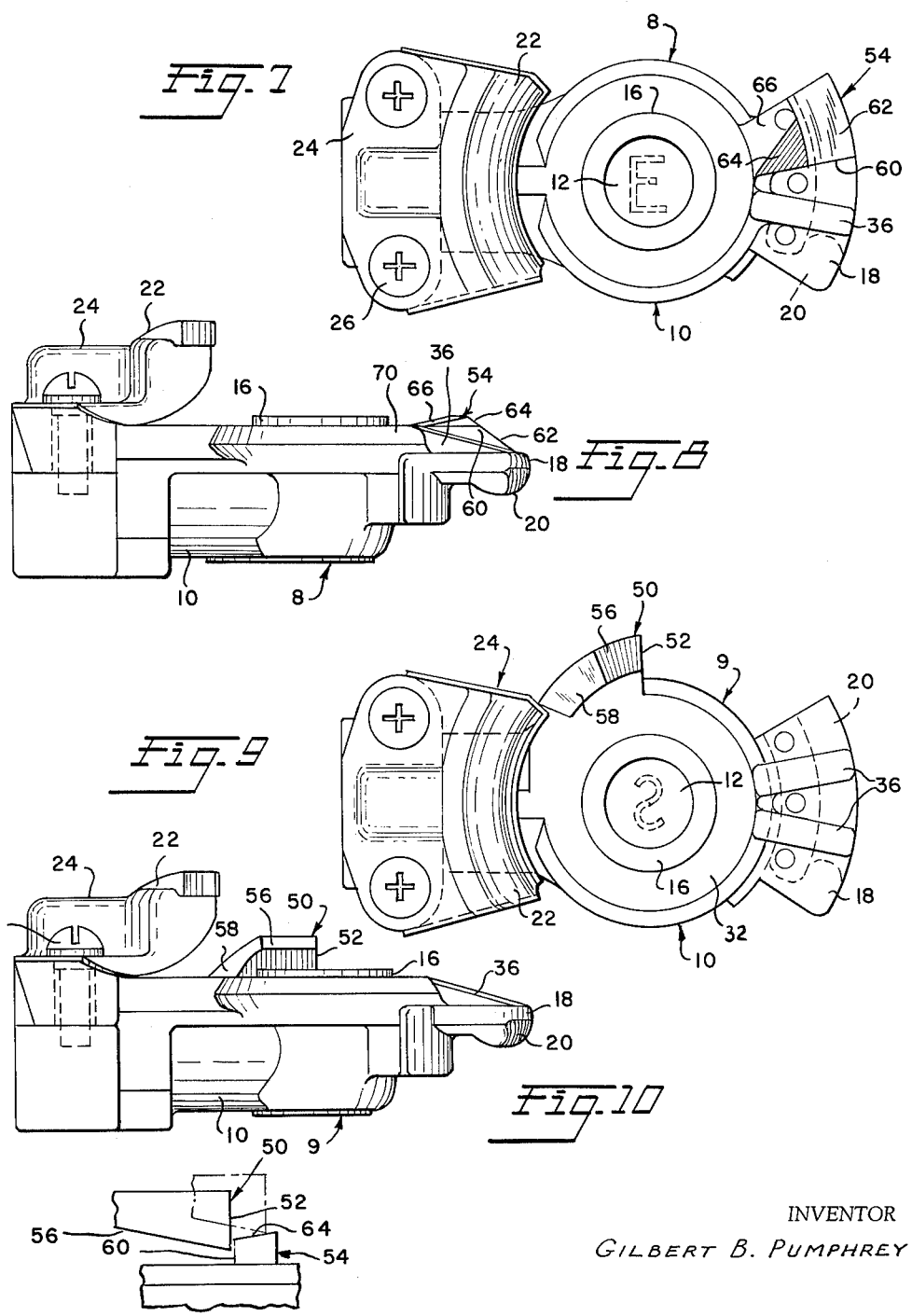

United States Patent Office 3,241,865
Patented Mar. 22, 1966

3,241,865
SAFETY MEANS FOR GLAD HAND COUPLINGS
Gilbert B. Pumphrey, Elyria, Ohio, assignor to Bendix-Westinghouse Automotive Air Brake Company, Elyria, Ohio, a corporation of Delaware
Filed Aug. 7, 1963, Ser. No. 300,482
7 Claims. (Cl. 285—74)

This invention relates to hose couplings known in the art as "glad hands" and more particularly to safety means for preventing the mismatching of such couplings.

Hose couplings of the glad hand variety are well known and have widespread use particularly in connection with tractor-trailer braking systems. As well known in the art braking systems of the foregoing nature include two pressure conduits, one of which is usually known as the "emergency line" and is normally charged at all times with air under high pressure. The other conduit is known as the "service line" and is only charged with air when the operator applies the brakes, usually by depression of a brake pedal. The tractor service and emergency lines lead to the rear of the tractor and each terminates in a length of flexible hose and an identical glad hand coupling. In like manner the forward ends of the trailer emergency and service lines terminate at identical glad hands and it should be obvious that it is essential to the correct operation of the tractor-trailer braking system that the glad hands of the tractor service and emergency lines be coupled with the corresponding glad hands of the trailer service and emergency lines.

Prior to the present invention, the only means for insuring correct mating of the glad hands has been by the use of the letters "S" and "E" standing for "service" and "emergency" stamped or painted on the appropriate glad hands. Where there is ample light or the operator uses due care, mismatching of couplings can be avoided, but where a trailer must be connected to the tractor in total darkness or where an operator is hasty or careless the couplings can be readily mismatched, possibly resulting in serious accident should the operator drive off with the system incorrectly connected.

It is an object of the present invention to avoid the foregoing by providing glad hands for tractor-trailer braking systems with safety means which positively prevents the mismatching of the tractor and trailer service and emergency glad hands.

More particularly it is an object of the invention to prevent mismatching of glad hands by equipping the same with abutment means or lugs which are incompatibly positioned and engage with each other upon mismatching of glad hands for positively preventing the latter from being coupled together, the abutment means or lugs being so arranged that when glad hands are correctly matched there is no interference with normal coupling movement of the two members.

Still another object of the inveniton, is to provide glad hands of the foregoing nature which cooperate with one another to prevent mismatching thereof yet are fully compatible with conventional glad hands or with glad hands not employing incompatible safety means of the present invention.

Other objects and their attendant advantages will become apparent as the following detailed description is read in conjunction with the accompanying drawings wherein:

FIG. 1 is a top plan view of a pair of mismatched glad hands equipped with the safety means of the present invention;

FIG. 2 is an enlarged broken cross sectional view taken substantially on the line 2—2 of FIG. 1;

FIG. 3 is a plan view of either a service or emergency glad hand equipped with a safety abutment means in accordance with the invention;

FIG. 4 is a plan view of a glad hand equipped with abutment means for preventing coupling of the glad hand with glad hand of FIG. 3;

FIG. 5 is a side elevational view of the glad hand of FIG. 3 and showing in phantom lines a second glad hand coupled thereto;

FIG. 6 is a partial side elevational view of the glad hand of FIG. 4;

FIG. 7 is a plan view of a glad hand illustrating a second embodiment of a safety lug;

FIG. 8 is a side elevational view of the glad hand of FIG. 7;

FIG. 9 is a plan view of a glad hand equipped with a lug particularly adapted to cooperate with the lug of FIG. 7;

FIG. 10 is a side elevational view of the glad hand of FIG. 9; and

FIG. 11 is an enlarged view illustrating the manner whereby the lugs of the respective glad hand cooperate to prevent mismatching of glad hands.

Referring now to the drawings, the glad hands illustrated are substantially identical to those shown and described in the patent to Stoudt, No. 3,052,489 and the following description will be confined to glad hands of this type though, as the description proceeds, it will be apparent to those skilled in the art that the invention is by no means restricted to the type of glad hands shown in the foregoing patent inasmuch as the invention is applicable to all couplings which are adapted to be interconnected with second couplings of substantially identical or mating construction.

Except for the location of the abutment means or safety lugs and the letters "E" and "S," standing for "emergency" and "service," the glad hands 6 and 7 illustrated in FIGS. 1 through 6, and the glad hands 8 and 9, illustrated in FIGS. 7 through 11, are identical in every respect and like reference characters correspond to like parts of the respective glad hands. Each glad hand comprises a cast body part 10 having a central vertical opening 12 therein communicating by way of a longitudinal passage (not shown) with a flexible hose 14 which could form part of either an emergency or service line of either a tractor or a trailer braking system. The central opening is surrounded by a sealing gasket 16 and extending forwardly beyond the opening on one side of the body 10 is an extension 18 having on the side thereof opposite the opening 12 an arcuate lock rib 20 which is adapted to engage behind a mating arcuate locking surface 22 formed in a separable lock arm 24 of stamped sheet material which is connected to the body part 10 by suitable fastening means, such as the screws 26 shown, so that the locking surface 22 is above but rearwardly of the opening 12. For a complete description of the separable lock arm, reference is made to the aforementioned Patent No. 3,052,489. Those skilled in the art will readily recognize that any coupling member is readily engaged with a mating coupling member merely by engaging the lock rib 20 of each member with the entrance of the mating locking surface 22 of the other member and then partially twisting the two members with respect to each other until the coupling parts are in alignment. In view of the well known nature of the couplings to which the present invention relates, and their manner of use, further description thereof is not considered necessary.

For purposes of illustrating one embodiment of the present invention, let it be assumed that the glad hand 6 of FIG. 3 is connected to an emergency line and bears on the side opposite the observer the letter "E" whereas the glad hand 7 of FIG. 4 is connected to a service line and has stamped on the outer side of the body 10 the letter "S." In order to positively prevent the coupling of the glad hand 6 of FIG. 3 with the glad hand 7 of FIG. 4, each of the glad hands 6, 7 is provided on opposite sides of its opening 12 with respective abutment means or lugs designated by the numeral 28 in FIGS. 3 and 5, in the case of glad hand 6, and by the numeral 30 in FIGS. 4 and 6 in the case of glad hand 7. The lug 28 comprises an upstanding part integrally connected or embedded in the upper surface 32 of the body part 10 of the glad hand 6 between the opening 12 and the lock arm 24. The lug 30 on the second glad hand 7 comprises an upstanding member integral with the lower side 34 of the forward extension 18 with the respective lugs 28, 30 being equally spaced away from the axes of the openings 12 and angularly displaced toward the entering sides of their corresponding rib or lock arm. The respective lugs have vertical dimensions such that the free or outer ends thereof overlap so that when one glad hand is mistakenly attempted to be coupled to the other glad hand, as intended to be illustrated in FIGS. 1 and 2, the confronting faces of the outer ends of the lugs engage each other to positively prevent relative movement of the glad hands in a coupling direction beyond the position illustrated in FIG. 1.

The vertical dimensions of the lugs 28, 30 are selected so that they interengage upon mismatching of glad hands, but otherwise do not extend so far in a vertical direction as to interfere in any way with any part of a mating coupling which is not equipped with a lug either because it is of conventional structure or because one coupling is correctly matched with a second coupling so that there is no interfering lug in the path of the other. Inasmuch as the majority of glad hands are provided with forwardly sloping strengthening webs 36 on the underside of the forward extension 18, it is desirable that the rear lug 28 between the lock arm 24 and the opening 12, as illustrated on the glad hand 6 in FIG. 5, have a downwardly and forwardly sloping upper surface 38 to insure that the lug 28 will not accidently interfere with the sloping web 36 of the mating glad hand. This relationship will be apparent from the phantom line 40 illustrated in FIG. 5. Additionally, it is desirable that the lugs be ramp-like in cross section as shown in FIG. 2 so as to have upper sloping surfaces 42, 44 to minimize possible interference with parts of a mating coupling during uncoupling movement.

FIGS. 7 through 11 illustrate a second modification of safety lug means for preventing mismatching of couplings. Inasmuch as it is essential that coupling members equipped with safety means of the invention be completely compatible with all other conventional glad hand couplings not so equipped to insure against the remote possibility of a lug of the invention interfering with a structural part of a conventional glad hand it may be desirable to locate the lugs on the glad hands in positions where they can in no way interfere with structural peculiarities of conventional couplings, which may be made by any of a number of different manufacturers. In accordance with the invention, this is accomplished by disposing one of the lugs on its glad hand in a position which is circumferentially clear of the space between an overhanging lock arm and the body of the glad hand. With particular reference to FIGS. 9 and 10, it will be observed that the glad hand 9 is provided with a vertical lug 50 which is spaced circumferentially clockwise well beyond the entrance of the locking surface 22 of the overhanging lock arm 24. The lug 50 has a vertical, radially extending sidewall 52 which is adapted to be engaged by an interfering lug 54 shown in FIGS. 7 and 8, on a mismatched glad hand 9 and whose structure and function will be hereinafter described in detail. Desirably the upper surface 56 of the lug 50 slopes downwardly and inwardly so as to clear the web 36 of an extension on a mating coupling and is joined to the body 12 of the coupling by a sloping arcuate ramp 58 which terminates approximately at the entrance to the locking surface 22. Because the lug 50 is entirely outside of the locking surface 22 it can extend, as shown in FIG. 10, vertically upwards a substantial distance to insure that the wall 52 will be in the path of a cooperating wall 60 of the lug 54 of the mismatched coupling. The vertical dimension of the lug 50, however, is less than the vertical spacing of the lock arm above the coupling body by an amount which allows the ready entrance of a mating extension not equipped with lug means beneath the locking surface of the lock arm.

As can be seen in FIG. 8, the lug 54 has a vertical dimension which extends only slightly above the flat upper surface 70 of the coupling body 10 and with this construction there is no difficulty with the lug being received beneath the lock arm of a second coupling. At the same time, however, the lug 50 on the second coupling because of its substantial vertical dimension is readily capable of engaging the relatively shallow vertical wall 60 of the lug 54. Though the lug 54 corresponds generally in function to the lug 30 shown in FIG. 3, it will be noted that in FIG. 7 that rather than being located on the entering side of the forward extension 18 it is on the opposite side so that the vertical wall 60 is intermediate the side edges of the forward extension. This is desirable so that when the coupling is to be engaged with a conventional coupling there is no projection on the leading edge of the forward extension which might in any way hinder the entrance of the lock rib 20 beneath the locking surface of the lock arm.

The upper forward edge of the lug 54 is joined to the forward edge of the extension 18 by an integral forwardly sloping wall 62 and the upper surface of the lug is shaped to provide a surface part 64 which slopes downwardly in the direction of the vertical wall 60 and a second surface part 66 which slopes downwardly and inwardly in the direction of the center opening. The function of the sloping parts 62, 64 and 66 of the lug 54 is to cooperate with the downwardly and inwardly sloping part 56 on the lug 50 of the other mismatching coupling 9 so that in the event the vertical walls do not engage, the sloping surfaces nevertheless serve to cam the couplings apart so that it is impossible for the lock rib of a mismatched coupling to be inserted into the entrance of the locking surface of the lock arm of the other coupling. In FIG. 11 the vertical walls of the respective lug are shown in solid lines as they would normally engage to prevent misconnection. The phantom lines show the camming action mentioned above.

From the foregoing description, it should be apparent that it is entirely immaterial as to which of the service or emergency couplings have a particular type of lug so long as the lugs on each type of glad hand are the same. Care, of course, should be exercised to not position lugs on mating service or emergency glad hands that they prevent the correct coupling of one glad hand to its properly mated glad hand.

From the foregoing description it should be apparent, that the present invention affords safety means for positively preventing the incorrect coupling of mismatched glad hands while at the same time not interfering with either the correct coupling of matched glad hands or the coupling of one glad hand equipped with the safety means of the invention with another glad hand not so equipped. It will be apparent that the invention is not limited to the embodiment thereof shown and described but it is susceptible of a variety of changes and modifications without, however, departing from the scope and spirit of the appended claims.

What is claimed is:
1. The combination with a pair of glad hand couplings each including a body having front and rear ends and a lateral opening extending through one side thereof, a lock arm connected to the rear end of said body and spaced above said one side, and a forward extension including a lock rib on the front end of said body, safety means for preventing the mismatching of said couplings comprising a vertical lug fixed to the body of one of said couplings on the said one side thereof, said lug being circumferentially positioned intermediate the forward extension and the entrance to said lock arm and including a vertical radial wall facing in the direction of said extension, a second lug on the extension of the other coupling on the said one side thereof, said second lug being circumferentially spaced away from the entering side of said extension and having a radial vertical wall intermediate the sides of said extension and facing the entering side thereof, the respective vertical walls of said lugs having dimensions wherein said lugs engage each other to prevent positively connection of said couplings upon movement thereof in a coupling direction, said lugs being constructed and arranged to not interfere with the connection of a coupling not equipped with a lug engageable with one or the other of the first mentioned lugs.

2. The combination of claim 1 wherein the upper surfaces of both of said lugs are upwardly sloping so as to effect camming action of one lug on the other to prevent coupling in the event the vertical walls do not engage.

3. In combination with a pair of glad hand couplings each including a body having front and rear ends and a lateral opening extending through one side thereof, a lock arm connected to the rear end of said body and spaced above said one side, and a forward extension including a lock rib on the front end of said body, means for preventing the mismatching of said couplings comprising a vertical lug fixed to the body of one of said couplings and a second vertical lug fixed to the forward extension of the other of said couplings in an incompatible position with respect to the position of said first lug so as to engage the latter and prevent positively the connection of said couplings to each other when moved in a coupling direction, each of said lugs having a vertical dimension substantially less than the spacing of said lock arm above said one side so as not to interfere with the connection of a glad hand coupling not equipped with an incompatibly positioned lug.

4. The combination according to claim 3 wherein said first named vertical lug is provided with a vertical wall positioned between the forward extension and the entrance to said lock arm.

5. The combination according to claim 4 wherein said second vertical lug is provided with a vertical wall positioned intermediate the sides of said extension.

6. The combination according to claim 3 wherein said first named lug is provided with an upper surface which slopes forwardly and downwardly toward said one side of the body.

7. In combination with a glad hand coupling comprising a body part having front and rear ends and a lateral opening extending through one side thereof, a lock arm connected to the rear of said body part and spaced above said one side, said body part having an integral forward extension carrying a lock rib, and one side of said lock arm being free of obstructions to provide an entrance for an extension of a compatible coupling, and safety means integral with said body part, said safety means being arranged and constructed to prevent said coupling from being connected with a mismatched coupling provided with incompatible safety means while permitting said coupling to be connected with a mating coupling equipped with compatible safety means, said safety means including lug means rigid with said body part and having an upper surface which slopes forwardly and downwardly toward said one side of said body part, said lug means extending upwardly from said one side a height substantially less than the spacing of said lock arm above said side so as to permit passage of the extension on a mating coupling equipped with compatible safety means, said lug means including a vertical side wall disposed on said body part in a plane parallel to the axis of said opening and positioned between the forward extension and said entrance to said lock arm so as to be in the circumferential path of movement of incompatible safety means of a mismatched coupling whereby connection of mismatched couplings is positively prevented.

References Cited by the Examiner

UNITED STATES PATENTS

| | | | |
|---|---|---|---|
| 584,705 | 6/1897 | Redfern | 285—68 |
| 1,797,423 | 3/1931 | Kelley | 285—68 |
| 1,842,897 | 1/1932 | Culp. | |
| 2,689,140 | 9/1954 | Bonacci | 285—99 |

CARL W. TOMLIN, *Primary Examiner.*